United States Patent [19]

Harrer

[11] 4,091,964
[45] May 30, 1978

[54] AIR CUTOFF PAD FOR AN AIR PLANTER

[75] Inventor: Paul H. Harrer, La Porte, Ind.

[73] Assignee: Allis-Chalmers Corporation, Milwaukee, Wis.

[21] Appl. No.: 743,152

[22] Filed: Nov. 18, 1976

Related U.S. Application Data

[63] Continuation-in-part of Ser. No. 508,672, Sep. 23, 1974, Pat. No. 4,074,830.

[51] Int. Cl.² ............................................. A01C 7/04
[52] U.S. Cl. ..................................... 221/266; 221/278
[58] Field of Search .................. 221/278, 266; 111/77; 222/309–313, 317, 368, 195, 370

[56] References Cited

U.S. PATENT DOCUMENTS

| | | | |
|---|---|---|---|
| 2,808,181 | 10/1957 | Oehler et al. | 222/368 |
| 3,251,511 | 5/1966 | Lloyd | 222/370 X |
| 3,888,387 | 6/1975 | Deckler | 221/278 |
| 4,047,638 | 9/1977 | Harrer et al. | 221/278 |

Primary Examiner—Stanley H. Tollberg
Attorney, Agent, or Firm—Charles L. Schwab

[57] ABSTRACT

A vertical rotating disc has perforated seed pockets which pick up individual kernels of seed from an air pressurized cavity of a planter housing. Air flowing through the perforated pockets creates a pressure differential which moves a kernel into each pocket as the pocket moves on an arcuate path upwardly through the cavity. The pocket then moves into axially confronting relation with a flat sealing surface of a resilient air cutoff pad which sealingly engages the seed disc to prevent escape of air and holds the seed in the pocket as the disc rotates further to bring the pocket to the lower part of the housing where the seed falls by gravity into the soil. The air cutoff pad is arcuate in shape and is held in place by a pair of screws. Thin sheets of plastic material are bonded to the front and back sides of the pad and stiffening material, such as plastic cement, is added to the radially outer edge of the pad. The added material stiffens the pad so that it substantially retains its shape during planting whereby the lodging of the seed in the seam between the radially outer edge of the pad and the housing is minimized or eliminated.

15 Claims, 6 Drawing Figures

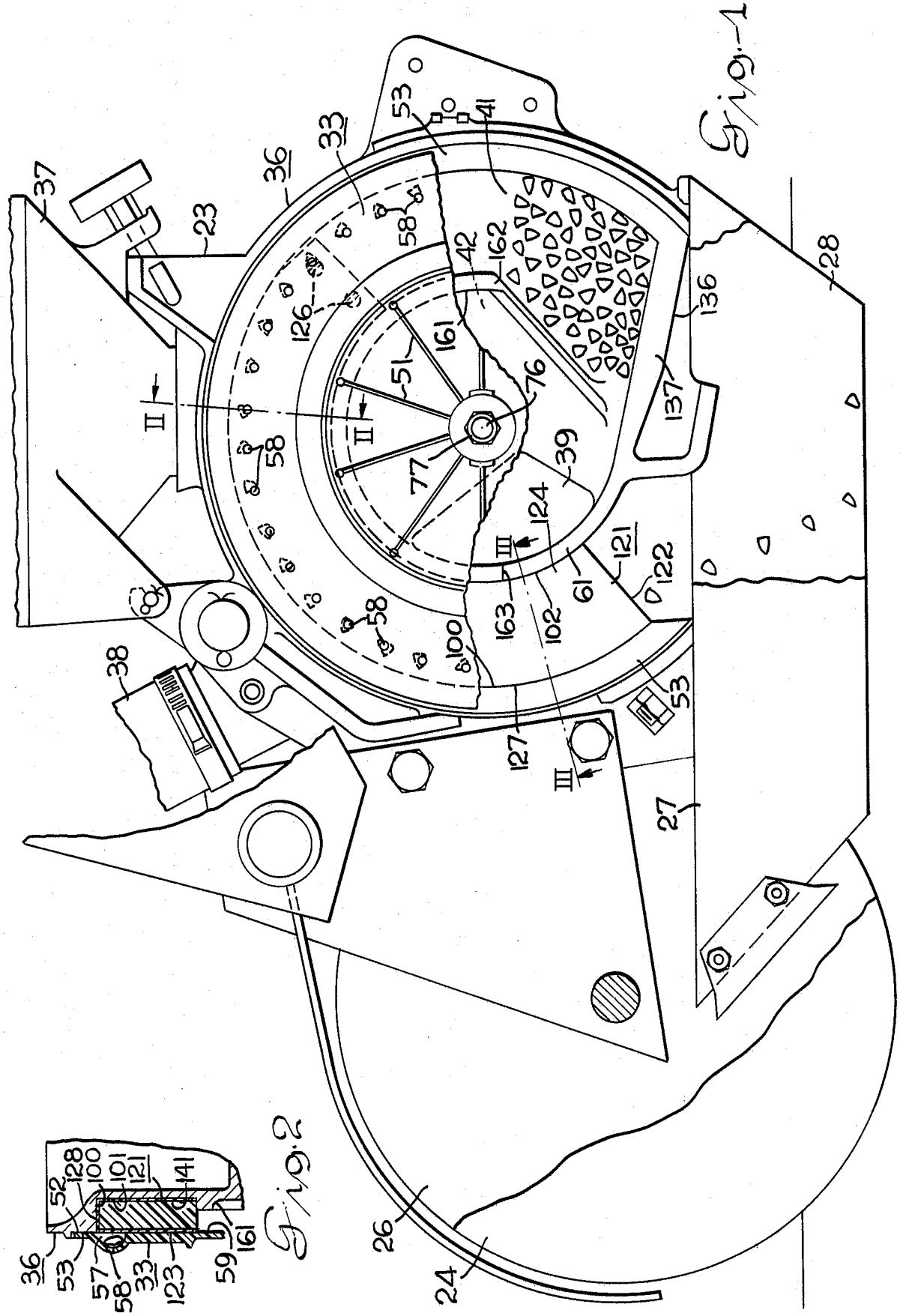

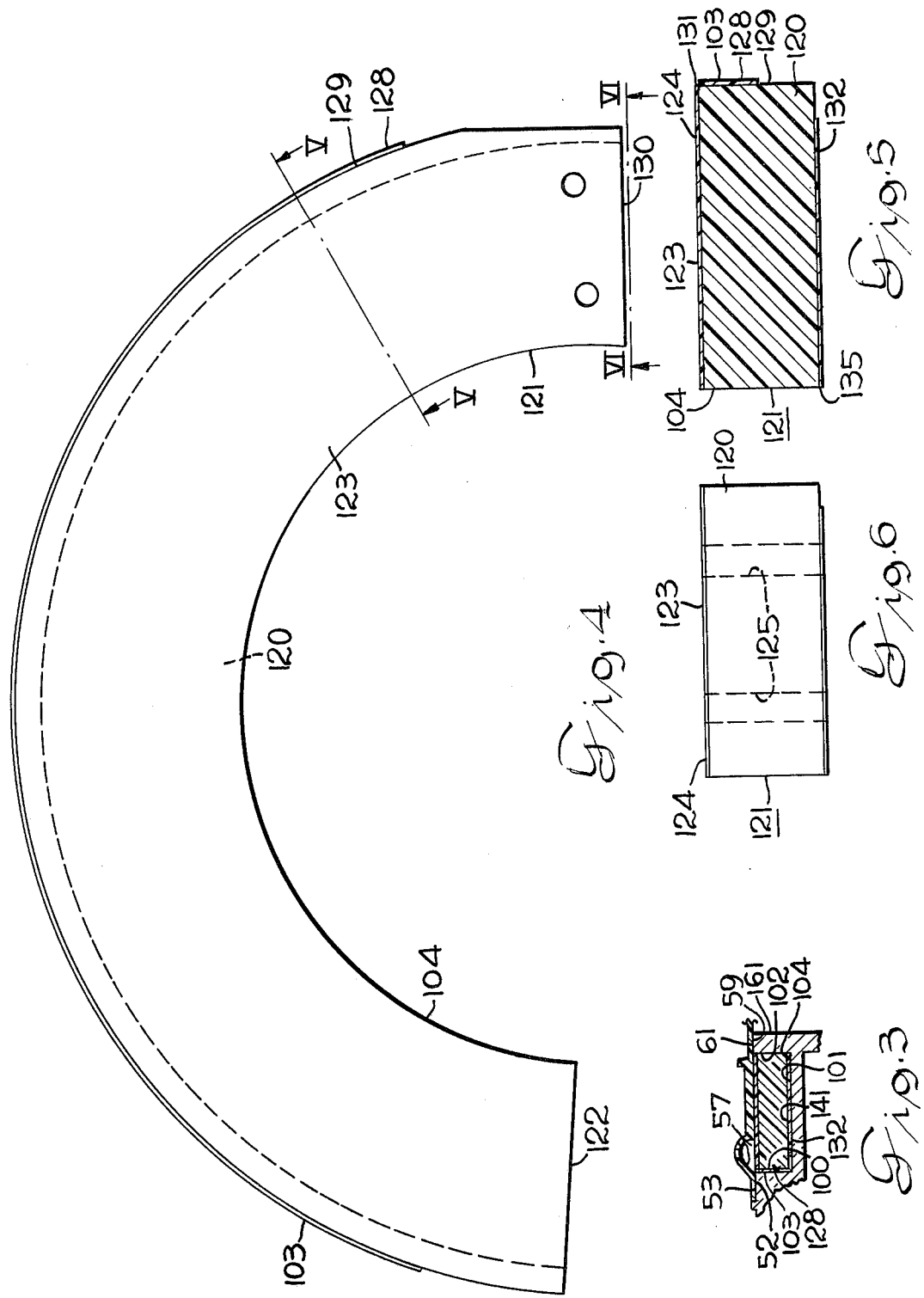

4,091,964

AIR CUTOFF PAD FOR AN AIR PLANTER

RELATED APPLICATIONS

This application is a continuation-in-part of U.S. patent application, Ser. No. 508,672, of Charles E. Adams, Harold E. Quackenbush, Paul H. Harrer, LeRoy Langford and Alvin L. Cleek for Compressed Air Seed Planter filed Sept. 23, 1974, now U.S. Pat. No. 4,074,830. Another related U.S. patent application is that of Paul H. Harrer and LeRoy Langford, Ser. No. 680,332, filed Apr. 26, 1976 for a Seed Disc for an Air Planter, now U.S. Pat. No. 4,047,638.

BACKGROUND OF THE INVENTION

In air or vacuum planters wherein a rotating disc with seed pockets is used to singulate kernels of grain, such as shown in U.S. Pat. Nos. 1,046,199; 1,331,235; 2,991,909; 3,434,437; 3,608,787 and 3,888,387; it is desirable to adequately seal the pressure or vacuum chamber in relation to the atmosphere. The present invention has that objective.

BRIEF SUMMARY OF THE INVENTION

The air cutoff pad of this invention is adapted for use in an air planter wherein flowing air is used to trap the seeds in perforated pockets in the vertically disposed disc as it rotates through or beside a pressurized housing cavity which contains seed. As the pocket moves upwardly on a curved path towards its apex, it is covered by an arcuate air cutoff pad until it passes to an open area at the bottom of the planter housing, at which point the seed in the pocket falls by gravity into the furrow in the soil opened by a furrow opener mechanism. The body of the arcuate pad is made of resilient material and plastic sheets are bonded to its opposite sides. To further stiffen the pad, a covering of pliable cement is applied to the radially outer peripheral edge of the pad. The sheet of plastic applied to the face of the pad confronting the singulating disc helps seal off the pressurized seed cavity and is relatively long-wearing. The facing sheets and peripheral coating are comprised of relatively stiff, dense plastic material and provide a desired stiffness at the outer peripheral edge and causes the pad to substantially retain its desired arcuate shape during operation of the planter.

It is an object of this invention to provide an air cutoff pad which adequately seals the pressurized seed cavity of a vertical disc air planter and retains its shape during use.

It is a further object of this invention to provide an air cutoff pad of the type mentioned in the previous paragraph which is sufficiently stiff at its outer peripheral edge to substantially prevent seeds from becoming lodged between the pad and the planter housing.

BRIEF DESCRIPTION OF THE DRAWINGS

The foregoing and other objects and advantages of this invention will be apparent on reference to the drawings in which:

FIG. 1 is a side view of a planter unit incorporating the present invention with parts broken away for illustration purposes;

FIG. 2 is a section view taken along line II—II in FIG. 1;

FIG. 3 is a section view taken along line III—III in FIG. 1;

FIG. 4 is a side view of an air cutoff pad used in the present invention;

FIG. 5 is an enlarged view taken along line V—V in FIG. 4; and

FIG. 6 is an enlarged view taken along line VI—VI in FIG. 4.

DETAILED DESCRIPTION OF THE DRAWINGS

Referring to FIGS. 1, 2 and 3, the planter unit 23, which is similar in construction to that shown in copending U.S. application Ser. No. 508,672, includes a pair of furrow opening discs 24, 26 and a pair of transversely spaced runners or shoes 27, 28. The shoes have their longitudinally central portions disposed on opposite sides of a vertical seed singulating disc 33 and converge at their front ends which carry scrapers for the inner, confronting sides of discs 24, 26. The planter unit also includes a housing 36 and a seed hopper 37. Seed is supplied by gravity from the hopper 37 to a cavity 41 of the housing 36 by way of a passageway 42. A blower, not shown, supplies air to the cavity 41 of the housing 36 by way of a conduit 38 and a housing passageway 39.

The disc 33 is constructed of a relatively stiff flexible plastic material with radial ribs 51 to provide rigidity and strength for the central portion of the disc. The radially outer portion of the disc is somewhat more flexible to permit deflection of the disc 33 from its slightly cupped non-installed shape to a flattened installed condition as shown in FIGS. 2 and 3 wherein the radially outer portion of the flat surface 52 confronting the housing 36 is in sealing engagement with a flat axially facing sealing surface 53 on the housing. The disc acts like a belleville washer to provide an axial force to insure sealing engagement with the housing. The radially outer portion of the disc 33 includes walls defining a plurality of circumferentially spaced seed pockets 57 on the axial side of the disc which confronts the cavity 41. Each of the pockets 57 has a small opening 58. An annular sealing area 59 is provided on the seed disc 33 radially inwardly from the seed pockets 57 which cooperates with a complementary sealing surface 61 formed on the housing in the area where the seed drops from the disc. The seed disc 33 is maintained on its drive shaft 76 by a nut 77.

As the seed planting disc 33 rotates counterclockwise, as viewed in FIG. 1, a kernel of seed is induced to move into the pocket 57 by air flowing from the pressurized cavity 41 to atmosphere by way of the opening 58 in each pocket. As the disc continues its counterclockwise rotation, as viewed in FIG. 1, each pocket will move adjacent to a flexible pad 121, at about the 1:30 o'clock position, which serves to retain the single kernel of seed in the pocket until the trailing edge 122 of the pad 121 is passed, at about the 7:30 o'clock position, at which point the seed drops into the furrow opened by discs 24, 26 and held open by vertically disposed shoes 27, 28. The circumferentially opposite ends 122, 130 are spaced approximately 180° apart. In other words, the pad 121 is in the shape of a semicircular arc. It is believed desirable for the air cutoff pad to extend for more than 90°. Referring also to FIGS. 4, 5 and 6, the body 120 of the arcuate resilient pad 121 is made of suitable flexible foam plastic material of uniform thickness and an outer layer 123 of dense tough plastic presenting a flat surface 124 confronting the pockets 57 is bonded thereto. The pad 121 is fastened to the housing by a pair of screws 126 extending through openings 125 in the pad and threadedly engaging drilled and tapped openings in the housing 36. As shown in FIGS. 2 and 3, the resilient pad 121 has been compressed to a reduced width or thickness. The pad 121 fits snugly in the flat bottomed recess 141 defined by housing surfaces 100, 101, 102 and serves to seal the cavity 41 by its engagement with the disc 33 between the housing sealing surfaces 53 and 61. The cylindrical inner and outer surfaces 103, 104 of the pad 121 sealingly engage the complementary surfaces 100, 102 on the housing 36.

The bottom of the seed cavity 41 is closed by sealing engagement between the disc 33 and an axially facing sealing surface 137 on flange 136 extending radially inward from sealing surface 53 to sealing surface 61. Actually, the sealing surfaces 53, 137 and 61 are continuous and lie in the same vertical plane. Surface 61 is formed on a radially arcuate flange 161 which increases in axial dimension, from its beginning at point 162, counterclockwise to line 163. During operation, the disc 33 serves as a sidewall closure for the cavity 41 on one axial side thereof through its sealing contact with the surface 123 of the pad 121 and the sealing surfaces 53, 137 and 61 on the housing 36.

It has been determined that 1.6 pounds per cubic foot polyether foam material is a satisfactory resilient material for the body 120 of the pad 121. It has also been found that a 0.012 inch thick polyurethane film or sheet is suitable material for the plastic layer 124 on the axial side of the pad 121 in sealing engagement with the seed disc 33. While a pad 121 of polyether foam with a layer 124 of polyurethane film bonded to one axial side provides a reasonably satisfactory cutoff pad, in some instances seeds may tend to roll out of the pockets 57 and wedge between the radially outer edge of the pad 121 and the radially inward facing cylindrical wall surface 100 at the juncture 127. This not only causes skips in planting but also reduces the effectiveness of the sealing function of the air cutoff pad. In order to increase the axial stiffness of the radially outer edge of the pad, a coating or layer 128 of PLIOBOND cement marketed by Goodyear Tire and Rubber Company is applied to the outer periphery 129 of the pad 121. This layer 128 is pliable yet sufficiently stiff to properly resist rollover of the outer arcuate edge or corner 131, thus helping to prevent the seeds from rolling into the juncture between the pad 121 and the housing surface 100. The layer 128 extends axially from the corner 131 over a major part of the width of the surface 129 of the pad 121. The layer 128 extends circumferentially from near one circumferential end 130 of the pad 121 near to the other end 122 as is shown in FIG. 4.

In order to increase the resistance of the pad 121 to deflection to a decreased radius when a seed rolls out of a pocket and tends to wedge between the radially outer periphery of the pad 121 and the housing 36, a 0.010 inch thick layer 132 of MYLAR plastic is bonded to the axial side of the pad remote from the seed disc 33, which is on the axially opposite side of the pad 121 from the sealing layer 124. The layer 132 is circumferentially co-terminous with the pad body 120 but is of a slightly less radial dimension. The layer 132 extends radially from the inner arcuate edge 135 to near the outer periphery 129.

It is within the spirit of the present invention to bond a layer of a suitable thin plastic strip to the radially outer surface 129 of the pad 121, in place of the layer of PLIOBOND cement; however, a pad of such construction is believed to be more expensive.

The embodiments of the invention in which an exclusive property or privilege is claimed are defined as follows:

1. An air cutoff pad for an air planter of the type having a housing with a seed cavity to which bulk seed and pressurized air are supplied and coplanar axial facing sealing surfaces radially spaced from one another by a flat bottom arcuate recess terminating at a seed drop portion at the lower part of the housing and a vertical seed disc with circumferentially spaced seed pockets and a generally flat sealing face in axially abutting and sealing relationship with the sealing surfaces on the housing, said pad comprising:
   an arcuate body of resilient material having
      radially inner and outer cylindrically shaped peripherial sides,
      axially opposite flat sides, and
      circumferentially opposite ends, said pad being adapted to fit snugly in said recess with one of said flat sides in confronting relation to said sealing face of said disc and
   a separate layer of dense plastic bonded on said one flat side adapted for sealing engagement with said sealing face of said disc.

2. The pad of claim 1 wherein resilient material is foam plastic.

3. The pad of claim 1 wherein said ends are spaced circumferentially more than 90 degrees from one another.

4. The pad of claim 1 wherein said layer is polyurethane film.

5. The pad of claim 1 wherein said body is polyether foam.

6. The pad of claim 5 wherein said layer is polyurethane film.

7. The pad of claim 1 and further comprising a layer of relatively dense plastic on the radially outer peripherial side of said body increasing the axial stiffness of the radially outer portion of said pad.

8. The pad of claim 1 and further comprising a layer of relatively dense plastic material on a major portion of the axial side of said body opposite to said one side.

9. The pad of claim 8 and further comprising a layer of relatively dense plastic on the radially outer peripheral side of said body increasing the axial stiffness of the radially outer portion of said pad.

10. The pad of claim 9 wherein said pad in a non-compressed condition is axially thicker than said recess.

11. The pad of claim 9 wherein said body is made of plastic foam.

12. The pad of claim 1 wherein said axially opposite sides are parallel.

13. The pad of claim 1 wherein said layer of plastic on said radially outer peripheral side is a coating of plastic cement.

14. The pad of claim 13 wherein said body is made of plastic foam.

15. The pad of claim 14 wherein said pad in a non-compressed condition is axially thicker than said recess.

* * * * *